United States Patent
Neumann

(10) Patent No.: US 11,874,750 B2
(45) Date of Patent: *Jan. 16, 2024

(54) ACTUATION OF EXECUTION UNITS

(71) Applicant: INOVA SEMICONDUCTORS GMBH, Munich (DE)

(72) Inventor: Roland Neumann, Munich (DE)

(73) Assignee: INOVA SEMICONDUCTORS GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,517

(22) Filed: Nov. 22, 2022

(65) Prior Publication Data

US 2023/0079838 A1 Mar. 16, 2023

Related U.S. Application Data

(63) Continuation of application No. 17/479,443, filed on Sep. 20, 2021, now Pat. No. 11,556,439, which is a continuation of application No. PCT/EP2020/025052, filed on Feb. 5, 2020.

(30) Foreign Application Priority Data

Mar. 25, 2019 (DE) ...................... 10 2019 002 119.3

(51) Int. Cl.
*G06F 11/20* (2006.01)
*H04L 41/0853* (2022.01)
*H04L 41/12* (2022.01)
*H04L 67/125* (2022.01)

(52) U.S. Cl.
CPC ...... *G06F 11/2033* (2013.01); *H04L 41/0853* (2013.01); *H04L 41/12* (2013.01); *H04L 67/125* (2013.01); *G06F 2201/85* (2013.01)

(58) Field of Classification Search
None
See application file for complete search history.

(56) References Cited

U.S. PATENT DOCUMENTS

| | | |
|---|---|---|
| 2012/0039217 A1 | 2/2012 | Halsall |
| 2016/0234037 A1 | 8/2016 | Mabuchi |
| 2017/0142602 A1 | 5/2017 | Otomo et al. |
| 2017/0150464 A1 | 5/2017 | Kazehaya et al. |

(Continued)

FOREIGN PATENT DOCUMENTS

| | | |
|---|---|---|
| DE | 10 2014 003 066 A1 | 9/2015 |
| DE | 10 2016 125 290 A1 | 9/2017 |
| DE | 10 2018 007 141 A1 | 8/2019 |

(Continued)

OTHER PUBLICATIONS

International Search Report issued for corresponding International Patent Application No. PCT/EP2020/025052 dated Feb. 5, 2020.

(Continued)

*Primary Examiner* — Chi H Pham
*Assistant Examiner* — Raul Rivas

(57) ABSTRACT

A method and corresponding set-up system arrangement are provided for actuating execution units. A communication node is further provided which is suitable for use in the method or in the system arrangement. Also provided is a computer program comprising control commands which implement the proposed method or operate the proposed system arrangement.

11 Claims, 12 Drawing Sheets

(56) References Cited

U.S. PATENT DOCUMENTS

2017/0270068 A1  9/2017  Wakita

FOREIGN PATENT DOCUMENTS

| WO | 2014012882 A1 | 1/2014 |
| WO | 2017162323 A1 | 9/2017 |
| WO | 2018103880 A1 | 6/2018 |

OTHER PUBLICATIONS

Written Opinion of the International Searching Authority with English translation issued for corresponding International Patent Application No. PCT/EP2020/025052 dated Apr. 1, 2020.
Final Office Action issued for U.S. Appl. No. 17/479,443 dated Jul. 25, 2022.
Notice of Allowance issued for U.S. Appl. No. 17/479,443 dated Nov. 21, 2022.

ACTUATION OF EXECUTION UNITS

CROSS REFERENCE TO RELATED APPLICATIONS

This application is a continuation of U.S. patent application Ser. No. 17/479,443, filed Sep. 20, 2021, which is a continuation of International Application No. PCT/EP2020/025052, filed on Feb. 5, 2020, which takes priority from German Patent Application No. 10 2019 002 119.3, filed on Mar. 25, 2019, the contents of each of which are incorporated by reference herein.

TECHNICAL FIELD

The present invention relates to a method for actuating execution units and to a correspondingly set-up system arrangement. Moreover, a communication node is proposed which is suitable for use in the method or in the system arrangement. The present invention further relates to a computer program comprising control commands which implement the proposed method or operate the proposed system arrangement.

BACKGROUND

DE 10 2014 003 066 A1 discloses bus subscribers in a bus network and teaches dynamic addressing therefor.

DE 10 2018 007 141 A1 discloses a system arrangement for error-tolerant, electromagnetically acceptable actuation of a plurality of execution units.

DE 10 2016 125 290 A1 disclose a chained two-wire bus consisting of two single-wire data buses.

WO 2017/162 323 A1 discloses an efficient control arrangement and a control method in which sequentially arranged execution units are actuated by means of a command unit.

WO 2018/103 880 A1 discloses a compact LED arrangement, which can be used generically but, as a result of the compact construction, is advantageous in particular for use in a vehicle.

In conventional methods, a plurality of options are known for addressing control units connected in series. Generic approaches exist, which may be disadvantageous in specific application scenarios, as well as highly specialised approaches, which are no longer usable generically. For example, the CAN bus is known, which was developed in relation to cable harnesses and is intended to implement networking of control devices in particular.

In general, the complexity of the CAN protocol is much greater than for ISELED (registered trade mark) and thus more expensive. However, the greatest drawback of CAN and LIN is that because of the bus architecture they do not offer a natural (automatic) addressing option. In these cases, the address has to be configured. For ISELED (execution units), and also for segmented ISELED (line driver unit and execution units), there is a physically predetermined string, resulting in the option of assigning addresses automatically.

From the prior art, various execution units are known, which typically operate as a slave or a client and thus receive commands from a superordinate instance, typically referred to as a master. The execution units subsequently implement these commands. For this purpose, the prior art discloses various architectures or topologies in which corresponding execution units along with the control units thereof are to be arranged.

However, in this context the prior art has the problem that different requirements are set depending on the application scenario, and thus overall it has to be weighed up whether an energy-efficient method having high error susceptibility is to be provided, or a method which takes up more energy but is more error-proof as a result. Moreover, the dimensions of the provided place of use of an architecture of this type are to be taken into account. Some arrangements are not suitable for large-area use, and can therefore only be implemented on individual circuit boards. By contrast, other architectures can be installed over a large area over several metres, and thus have to meet completely different requirements from system arrangements on individual circuit boards.

In individual application scenarios there are very specific requirements, which cannot be satisfied using generic network architectures. As a result, it is necessary to propose special protocols, network architectures and methods which precisely meet the needs of the application scenario. One special field of application is the automotive field, where work is cost-efficient, in other words involves low technical outlay, and moreover reliable network architectures are required. The reason why the reliability of the network architectures is so important is that automobiles are subject to longer maintenance intervals, and as a result the customer would not tolerate a failure of this type. Moreover, safety-critical functions are often being provided, making failure safety essential.

Thus, among other things, in the prior art it is disadvantageous that network components may be provided which do not address the application scenario because individual components are too large-scale and potentially implement logic which is potentially not used. Moreover, there is a need for network architectures or components which are particularly efficient and which can also be produced with low technical outlay.

Failure safety is provided in that, among other things, individual components can be segmented in such a way that if an individual segment fails no further segments are affected. Overall, the components should be equipped as simply as possible so as to be able to work energy-efficiently and additionally to be able to function in an error-proof manner. Overall, as little energy as possible should be taken up, since not only does this have costs in terms of the energy itself, but there is also a risk of emitted radiation, and moreover development of heat is disadvantageous.

A further problem in the prior art is that often a particular network architecture prevents efficient implementation of a protocol. Thus, from the prior art, segmentations of network topology are known in which protocols of this type are optimised for series arrangements. Translating protocols which are optimised for series arrangements is typically complex and susceptible to error. It is thus advantageous to provide a method or a system arrangement which makes error-proof segmentation possible and additionally provides an efficient protocol, in such a way that the network architecture can work in an efficient, error-proof manner. Overall, it is always required for network protocols and network architectures to work compatibly with existing components.

Accordingly, an object of the present invention is to propose an improved method for actuating execution units which runs efficiently and in particular combines the advantages of both a series chain of execution units and a segmentation of execution units. Moreover, an object of the present invention is to propose a correspondingly set-up system arrangement, as well as a communication node which can be used both in the proposed method and in the proposed system arrangement. Moreover, an object of the present invention is to provide a computer program product comprising control commands which implement the proposed method or operate the system arrangement.

SUMMARY

Accordingly, a method for actuating execution units is proposed, comprising providing a physical network of series sub-chains of execution units, the individual sub-chains being addressed in series and, if an execution unit fails, merely the rest of the sub-chain failing, each sub-chain initially having exactly one upstream communication node connected upstream, and the communication nodes of the sub-chains being chained together in series in such a way that there is a communication chain of upstream communication nodes, individual communication nodes being switched to be passive in such a way that the rest of the communication chain persists, the communication nodes each having at least one input interface and at least one output interface and the at least one input interface and the at least one output interface being explicitly lockable, sequentially checking each of the sub-chains by means of a query to the respectively upstream communication node of the sub-chain in question, which node assigns a unique identifier to each execution unit of the sub-chain in such a way that each execution unit in the network is assigned a unique identifier, and addressing at least one execution unit, by means of the upstream communication node, with a command generated by a control unit upstream from the communication chain.

The execution units may take the form of components which are each independent, for example LEDs or sensors. This should merely be understood as an example, and all possible components may be used, for example network components such as a switch. The execution units receive control commands from a control unit, which may take the form of a microcontroller.

According to embodiments of the invention, initiation of the physical network is provided in such a way that the individual execution units receive an identifier and an address. As a result, the network itself is initially unknown, and in preparatory method steps the network is checked in such a way that components, specifically execution units, are identified and receive an identifier. The identifier serves to address the associated execution unit, in such a way that the control unit can address each individual execution unit selectively.

In a preparatory method step, a physical network of series chains of execution units is provided. This means that there is at least one sub-chain which is constructed in series, and as a result the execution units are coupled together in series. This sub-chain initially has a communication node. Thus, according to embodiments of the invention, it is provided that a sub-chain consists of at least one communication node. Preferably, but optionally, further execution units are coupled to this communication node. As a result, a first execution unit is communicatively coupled to a communication node. At least one further execution unit may be coupled to this first execution unit. Thus, an execution unit typically has at least two interfaces, one interface unit being coupled either to the communication node or to the preceding execution unit, and a second interface unit to a following execution unit. There is thus a sequence from a communication node, to which at least one further execution unit is connected in series. Exceptionally, it is also possible for merely the communication node to be present.

Since there are a plurality of sub-chains, there are also a plurality of communication nodes, and it is also possible in turn to interconnect the plurality of communication nodes. Thus, figuratively speaking, the sub-chains are present horizontally, as is also shown in the accompanying drawings. This results in for example a two-dimensional network, in which the execution units extend horizontally and the communication nodes extend vertically.

Thus, indirectly, all execution units are coupled to one another, in such a way that a communication node is connected upstream from each sub-chain of execution units and these upstream communication nodes are in turn coupled to one another in series.

The individual units may be coupled in different ways. Thus, it is preferably provided that the individual segments or sub-chains are arranged on a circuit board comprising a corresponding bus and the communication nodes may be coupled to one another using a wired connection. This is merely to be understood as an example and not as being definitive.

The communication starts from a control unit upstream from the communication chain. The communication nodes as a whole thus form a communication chain, at the start of which the control unit is located. As a result, the control unit can communicate indirectly with the execution units, a communication node being connected upstream from each sub-chain. The control unit thus primarily communicates with the communication nodes, which subsequently each pass on the control commands to the connected sub-chain.

Since it is initially not known which components are located in the physical network, each of the sub-chains is checked sequentially, in each case by means of a query to the associated upstream communication node. As a result, the control unit outputs a command which causes each communication node to check the sub-chain thereof, and subsequently corresponding identifiers are returned. It is thus advantageous that the control unit communicates with a first communication node, which subsequently checks how many or which execution units are arranged in the sub-chain in question. When this has been detected, the identifiers are returned to the control units, and this may generally also take place at a later point in time. As a result, when the first sub-chain has been checked, it is provided that, by means of a command to the second communication node, this communication node is caused to check the sub-chain thereof, and as a result generates identifiers which for example consecutively number the individual execution units.

This takes place sequentially and iteratively, in such a way that all communication nodes check the arranged sub-chains, and issue a unique identifier in each case for this purpose. The unique identifier is therefore available to the communication node, which thus has information as to which units are arranged in the sub-chain. Since all communication nodes pass on the identifiers thereof to the control unit, the control unit then has information concerning all available communication nodes along with attached execution units.

Once the individual identifiers of the execution units are known, at least one execution unit may be addressed, in such a way that it is addressed by the control unit indirectly via the communication node using the identifier. Thus, ultimately, each identifier of the execution units is known to the control unit, and the control unit can thus instruct the corresponding communication node, the chain of which includes the execution unit to be actuated, to bring about precisely this actuation. As a result, the control unit outputs a command which is conveyed indirectly via the communication node to the execution unit in question. A command may be a command which performs a read operation or a write operation. Thus, for example, as a command a sensor may be read out or else an LED has a corresponding colour value or brightness intensity conveyed thereto. Moreover, it is generally possible to read out status information from the execution units. This information is subsequently in turn conveyed indirectly via the communication nodes to the control unit.

According to embodiments of the invention, it is particularly advantageous that the individual sub-chains can be addressed in series and an efficient protocol is thus created. In this context, it is also possible, however, to segment the individual execution units in such a way that there is not a single sub-chain. There are thus a plurality of segments or sub-chains overall. Failure safety is thus provided so that if a member of a chain fails the whole of the rest of the chain does not fail, but rather merely the rest of the sub-chain fails. Thus, according to embodiments of the invention, it is particularly advantageous that the individual execution units can be controlled sequentially or in series but there may still be segmentation in hardware.

Moreover, it is particularly advantageous that the individual communication nodes can be switched to be passive, in such a way that signals are merely passed through these communication nodes. Thus, an individual sub-chain can fail, but the functionality of the further sub-chains is not impaired.

In one embodiment of the present invention, the actuation comprises a read operation and/or a write operation. This has the advantage that either the command from the control unit may cause a sensor value or status to be read out from the execution unit or a write operation takes place in such a way that a value can be communicated to the execution unit. This value may be a colour intensity or a brightness. In general, a combination of both operations is also possible.

In a further embodiment of the present invention, the unambiguous identifier takes the form of an address, a numbering and/or a name. This has the advantage that the individual execution units can be uniquely identified and subsequently a unique identifier, by means of which the execution unit can selectively initiate the execution unit, can be communicated to the control unit. In general, the identifier is also a general name, in such a way that for example human-readable source code is produced.

In a further embodiment of the present invention, when the execution unit is addressed for reading there is only communication with the sub-chain which includes the addressed execution unit. This has the advantage that further sub-chains can be masked and thus merely series communication takes place, in such a way that the control unit communicates with the execution unit indirectly via a communication node. The preceding communication nodes are thus connected through, and the output interface to following communication nodes is blocked. As a result, efficient addressing of execution units can be implemented. In particular, segmentation has an advantage because there is no need to address all execution units in series until the execution unit to be actuated is reached, but rather execution units from preceding sub-chains can be skipped.

In a further embodiment of the present invention, the communication nodes each have at least one input interface and at least one output interface. This has the advantage that the communication nodes typically have three interfaces, which take the form of coupled interfaces and can process both input signals and output signals. The interfaces are each described in greater detail with reference to the accompanying drawings. The interfaces are generally for data communication, it also being advantageous to block individual interfaces.

In a further embodiment of the present invention, the at least one input interface and the at least one output interface may be explicitly blocked. This has the advantage that efficient implementation takes place and interfaces can be blocked in such a way that further communication is not possible. This ensures that execution units which are not addressed also do not have to be further taken into account in the communication. Thus, typically only the sub-chain which includes the addressed execution unit is addressed. Further sub-chains are switched off in this manner by blocking interfaces.

In a further embodiment of the present invention, the at least one input interface and the at least one output interface may be blocked by the control unit and/or the associated communication node. This has the advantage that different protocols can be implemented and it can decided both centrally and in a decentralised manner which interfaces are to be blocked.

In a further embodiment of the present invention, the at least one input interface and the at least one output interface can be blocked as a function of a provided identifier. This has the advantage that it can be determined from the identifier which execution unit is to be addressed, and subsequently only the sub-chain which includes the execution unit is switched to be active. Thus, the preceding communication nodes are switched to be passive, in other words to connect through, and all further communication nodes are blocked. Thus, in the communication path, only one sub-chain is addressed, and all further sub-chains are masked in the communication. As a result, the proposed method is particularly efficient.

In a further embodiment of the present invention, the unique identifiers are conveyed to the control unit sequentially. This has the advantage that the identifiers are each returned, this taking place for example in such a way that the last execution unit in the network conveys the identifier back to the communication node indirectly via the preceding execution units, and the communication node subsequently conveys the identifier to the control unit. This then takes place using the penultimate execution unit, until the sub-chain in question has been worked through. Subsequently, the identifier of the last execution unit in the penultimate sub-chain is passed back.

In a further embodiment of the present invention, to each communication node, the identifiers from the sub-chain from which the communication node is upstream are conveyed. This has the advantage that the communication node has information from all execution units of the sub-chain thereof available. Each communication node thus knows the execution units from which it is upstream.

In a further embodiment of the present invention, individual communication nodes are switched to be passive in such a way that the rest of the communication chain persists. This has the advantage that individual communication nodes and thus sub-chains can be masked out in communication. Thus, from the control unit, there is only communication with the sub-chain which includes the addressed execution unit. As a result, signals are merely passed through or looped through by preceding communication nodes unchanged, in other words unprocessed.

In a further embodiment of the present invention, the sub-chains segment the entirety of the execution units. This has the advantage that not all execution units have to be connected in series, but rather individual segments can be created, and efficient protocolling still takes place by way of processing of individual sub-chains. Overall, the failure safety is increased as a result, since if one execution unit fails not all further execution units connected in series fail, but rather the execution units are segmented in such a way that merely all further execution units within the segment fail.

The object is also achieved by a communication node which is set up for use in the proposed method or in the proposed system arrangement.

The object is also achieved by a system arrangement for actuating execution units, comprising a physical network of series sub-chains of execution units, the individual sub-chains being addressable in series and being set up in such a way that if an execution unit fails merely the rest of the sub-chain fails, each sub-chain initially having exactly one communication node connected upstream, and the communication nodes of the sub-chains being chained together in series in such a way that there is a communication chain of upstream communication nodes, individual communication nodes being switchable to be passive in such a way that the rest of the communication chain persists, the communication nodes each having at least one input interface and at least one output interface and the at least one input interface and the at least one output interface being explicitly lockable, the communication nodes set up for sequentially checking each of the sub-chains by means of a query to the respectively upstream communication node of the sub-chain in question, which node is set up to assign a unique identifier to each execution unit of the sub-chain in such a way that each execution unit in the network is assigned a unique identifier, and a control unit set up for addressing at least one execution unit, by means of the upstream communication node, with a command generated by a control unit upstream from the communication chain.

The object is also achieved by a computer program product comprising control commands which carry out the method or operate the proposed system arrangement when the control commands are executed on a computer.

According to embodiments of the invention, it is particularly advantageous that the system arrangement provides structural features which functionally correspond to the method steps. Further, method steps are proposed which can also be structurally imitated by the system arrangement in terms of the corresponding functionality. Thus, the method is for operating the system arrangement and the system arrangement can carry out the proposed method.

Further advantages, features and details of the embodiments of the invention will be apparent from the following description, in which aspects of the invention are described in detail with reference to the drawings. The features mentioned in the claims and in the description may, each individually per se or in any desired combination, be essential to the invention. Likewise, the aforementioned features and those set out hereinafter may be used each in their own right or in a plurality in any desired combinations. Functionally similar or identical components are in some cases provided with the same reference signs. The terms "left", "right", "top" and "bottom" used in describing the embodiments relate to the drawings in an orientation with a normally readable drawing title and normally readable reference signs. The embodiments shown and described are not to be understood as definitive, but rather are of an exemplary nature for explaining the invention. The detailed description is for the information of a person skilled in the art, and so known circuits, structures and details are not shown or explained in detail in the description so as not to impede understanding of the present description.

BRIEF DESCRIPTION OF THE DRAWINGS

Further advantageous configurations are described in greater detail with reference to the accompanying drawings, in which.

DETAILED DESCRIPTION

Figure 1:
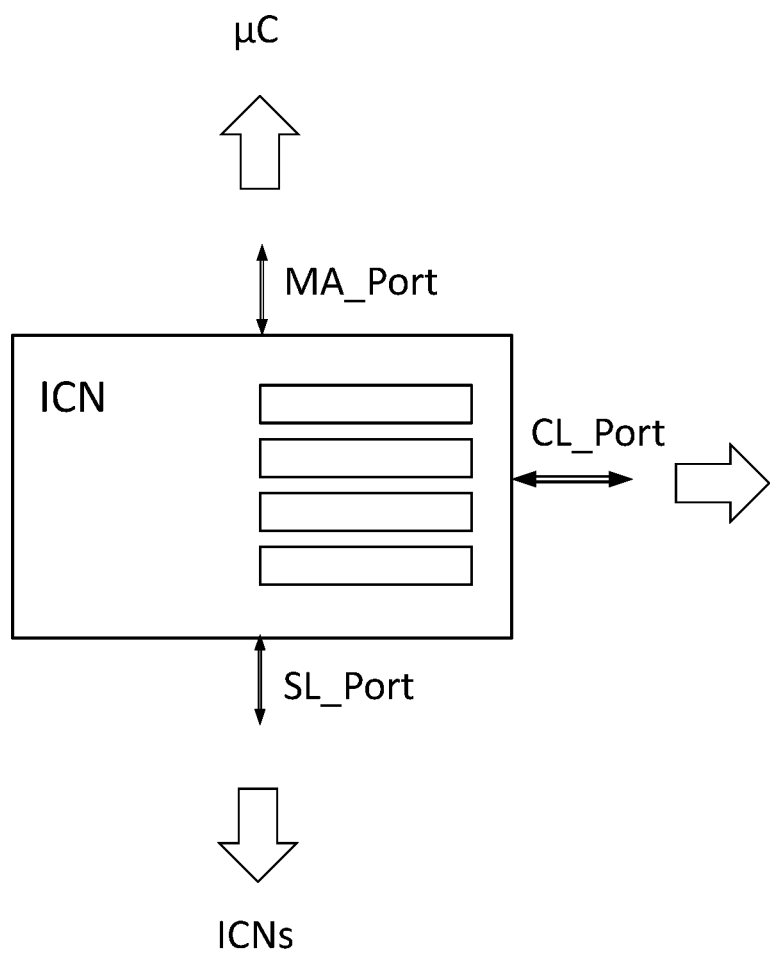
FIG. 1 shows an aspect of the communication node according to the invention and in particular the interface units thereof.

FIG. 1 shows a communication node ICN and shows in particular the corresponding interfaces. Thus, a communication node typically has a master interface unit MA_PORT, illustrated at the top in this case, a client interface unit CL_PORT, illustrated on the right in this case, and a slave interface unit SL_PORT, illustrated at the bottom in this case. The orientation of the communication node corresponds to the orientation as shown in the further drawings. Figuratively speaking, the communication chain is arranged vertically and the sub-chains are arranged horizontally. The shown communication node thus communicates upwards either with further communication nodes or with the control unit. To the right, the communication node communicates with a first execution unit. The execution unit optionally communicates with further execution units. Downwards, the shown communication node optionally communicates with further communication nodes. However, the end of the communication chain may also be reached, in such a way that no more communication nodes are connected.

Figure 2:
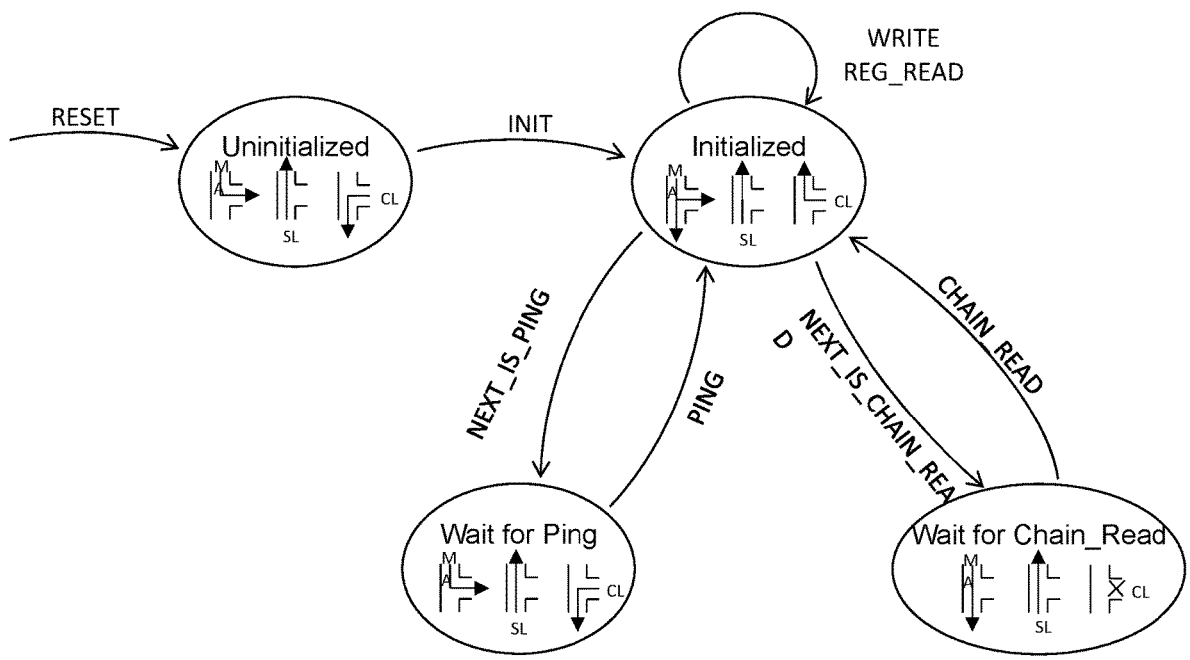
FIG. 2 is a state transition diagram showing states of the communication node, method or system arrangement according to the invention.

FIG. 2 is a state transition diagram, and shows in particular two states at the top and two at the bottom. The top left state is the state where the network is shown uninitialised. The arrows within the individual states show the direction of communication which is involved in this case. Thus, for initialisation, starting from the control unit at the top, a control command is conveyed to the right into the sub-chains. The values are ultimately passed back upwards, in such a way that the identifiers are known in the control unit.

The individual execution units communicate via the communication node. At top right, a state is shown which exhibits complete initialisation. The upper arrow signals that write operations and read operations can take place iteratively, since ultimately all execution units are known. The initialisation takes place in such a way that a query is sent to the individual components. Further, at bottom left a ping, in other words a query message, is waited for. If a component is queried, it reports back, and if a time window is exceeded, a timeout occurs. Thus, all components can be queried iteratively. At bottom right, it is illustrated that reading of the vertical chain is waited for until all communication nodes return the gathered identifiers.

Figure 3:
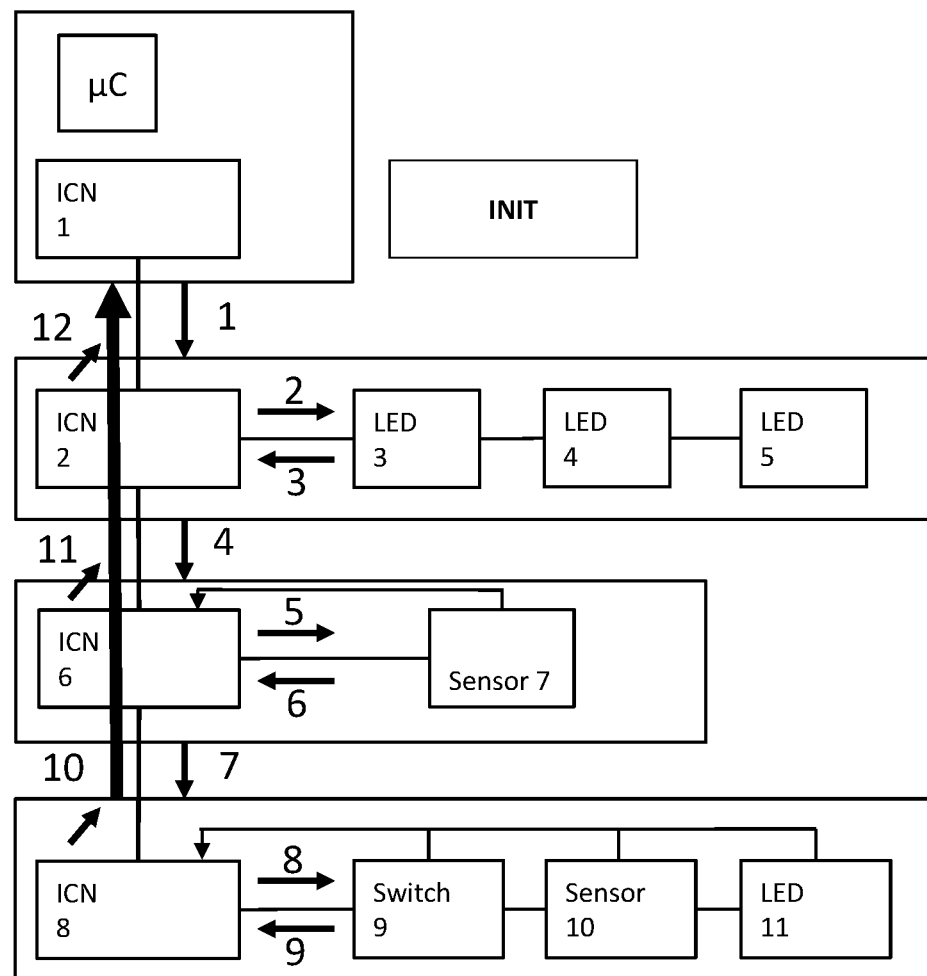
FIG. 3 is a schematic block diagram showing an aspect of the proposed system arrangement and a communication progression in accordance with the proposed method and in particular execution of the "INIT" command.

FIG. 3 shows the physical network, the control unit taking the form of a microcontroller, which is illustrated at the top in this case. Moreover, the communication nodes ICN are present on the left. ICN stands for ISELED communication network (registered trade mark), by way of example. The communication nodes are thus arranged vertically, and the execution units are arranged horizontally. Herein, an execution unit is, by way of example, an LED or a sensor. Alternatively, an execution unit may also take the form of a switch.

Moreover, FIG. 3 clarifies, by way of the individual numbers, how the identifiers are initialised. Thus, an identifier 1 is assigned to the first communication node and then an identifier 2 is assigned to the second communication node. Thereupon, the connected sub-chain is provided with identifiers in such a way that the first LED receives an identifier 3, the second LED receives an identifier 4 and the third LED receives an identifier 5. Subsequently, these identifiers are returned to the communication node 2. Thereupon, identifiers are issued in the next sub-chain, which is illustrated at the bottom in this case. Thus, the upstream communication node receives the identifier 6 and a sensor connected thereto receives the identifier 7. Subsequently, this identifier is returned and passed on via the communication node 6, 2 and 1 to the control unit. Subsequently, further identifiers are issued, in such a way that the next sub-chain, to which a switch 9 is coupled as well as a sensor 10 and an LED 11, starts with a communication node 8.

This is demonstrated below using pseudo source code, including English terms which are familiar to a person skilled in the art in this form and which he would also use in this manner.

```
Reset:
    STATE="uninitialized"
    wait for INIT command:
        all commands are discarded, except INIT
    INIT command detected at MA_Port:
        generate new INIT command and send to CL_Port
        wait for INIT sequence to complete at clients:
            set Address Registers and status_client.init
            generate new INIT command with
                addr=last_client_addr+1
            send INIT on SL_Port
            if last in chain:
                generate INIT answers* and send on MA_Port
                STATE="initialized"
            else:
                wait for INIT answers on SL_Port:
                    pass on to MA_Port
                when complete:
                    generate INIT answers* and send on MA_Port
                    STATE="initialized"
*INIT answer includes:
    client address+status_client.init
    own address+config.is_icn
```

In FIG. 3 and the following figures, components are based on example components. In particular, the switch 9 may take the form of a switch, an actuator, an interrupter and/or a scanner. The arrow from the components 9, 10 and 11 to the ICN 8 may be implemented using an interrupter, or at least one interrupter may be used in the communication. The same applies to the communication from the component 7 to the ICN 6. Arrows may always also be understood bidirectionally, even if this is not illustrated, since the direction of communication may also be reversed in direction during communication or during at least one further communication.

Figure 4:
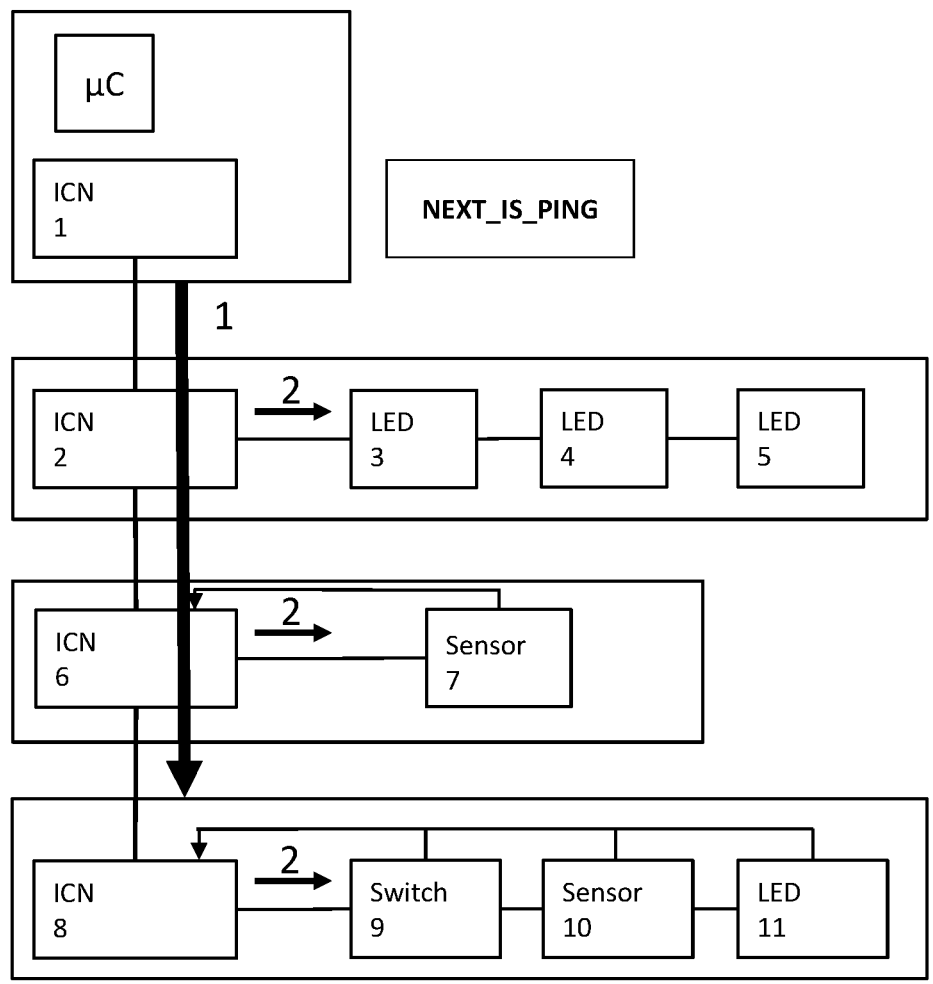
FIG. 4 is a further schematic block diagram showing an aspect of the proposed system arrangement and a communication progression in accordance with the proposed method and in particular execution of the "PING1" command.

FIG. 4 shows a ping process in which a corresponding message is conveyed to the associated upper interface unit of the communication node. Subsequently, these messages are conveyed to the sub-chain and in turn returned from the sub-chain to the communication node. Subsequently, they are passed on to the associated communication node following below, which then in turn checks the sub-chain thereof. Finally, the result is passed on upwards to the control unit.

```
STATE="initialized"
NEXT_IS_PING command detected at MA_Port:
    STATE="wait for ping"
    when command received at MA_Port:
        pass on to CL_Port, but not to SL_Port
    when answer received at CL_Port:
        pass on to SL_Port
    when answer received at SL_Port:
        pass on to MA_Port
```

Figure 5:
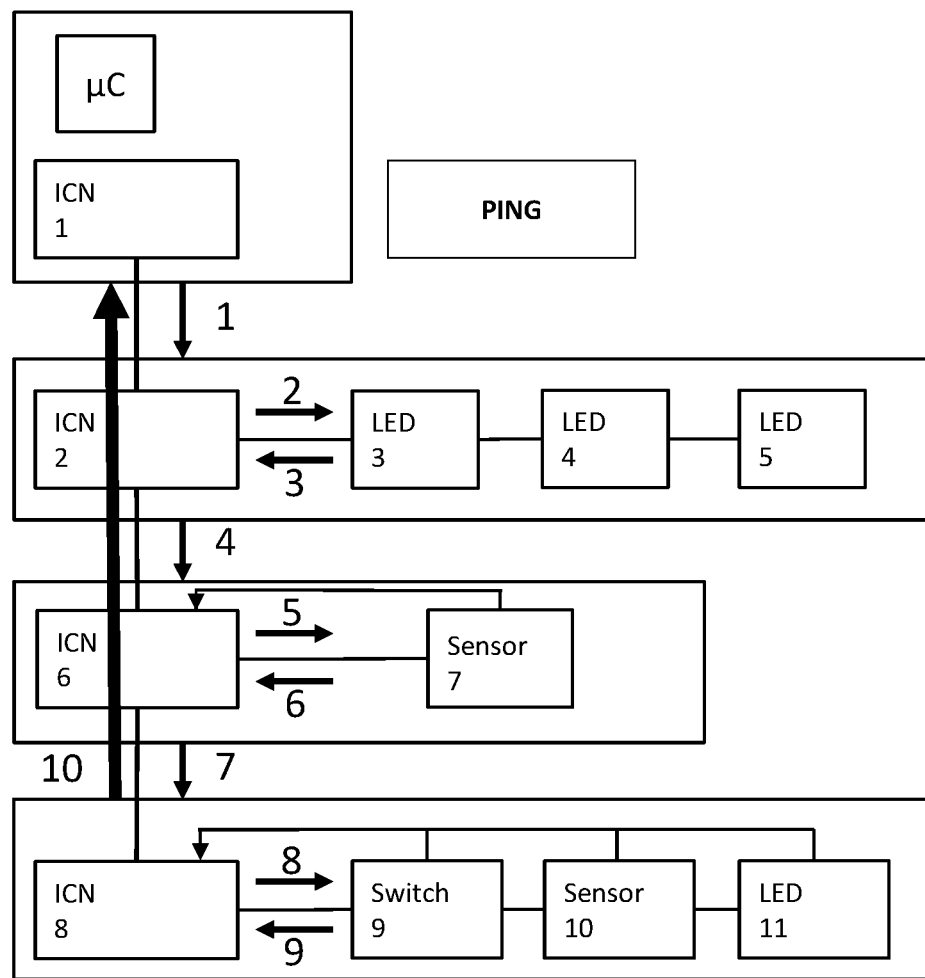
FIG. 5 is a further schematic block diagram showing an aspect of the proposed system arrangement and a communication progression in accordance with the proposed method and in particular execution of the "PING2" command.

FIG. 5 shows further progression of the process, and illustrates the communication process by way of the arrows. The following source code illustrates this wait for an answer, and in particular error handling is also demonstrated.

```
STATE="wait for ping"
    wait for PING command at MA_Port:
        pass on to CL_Port, but not to SL_Port
    wait for PING sequence to complete at clients
        save answer in last_client_answer register
        if last in chain:
```

```
        forward client answer to MA_Port
        STATE="initialized"
    else:
        if answer=last_client_addr:
            send PING on SL_Port
            wait for answer on SL_Port
            forward answer to MA_Port
            STATE="initialized"
        else: //client chain is not intact!
            send PING on SL_Port
            wait for answer on SL_Port
            overwrite answer with value of last_client_answer
                Register
            send to MA_Port
            STATE="initialized"
```

Figure 6:
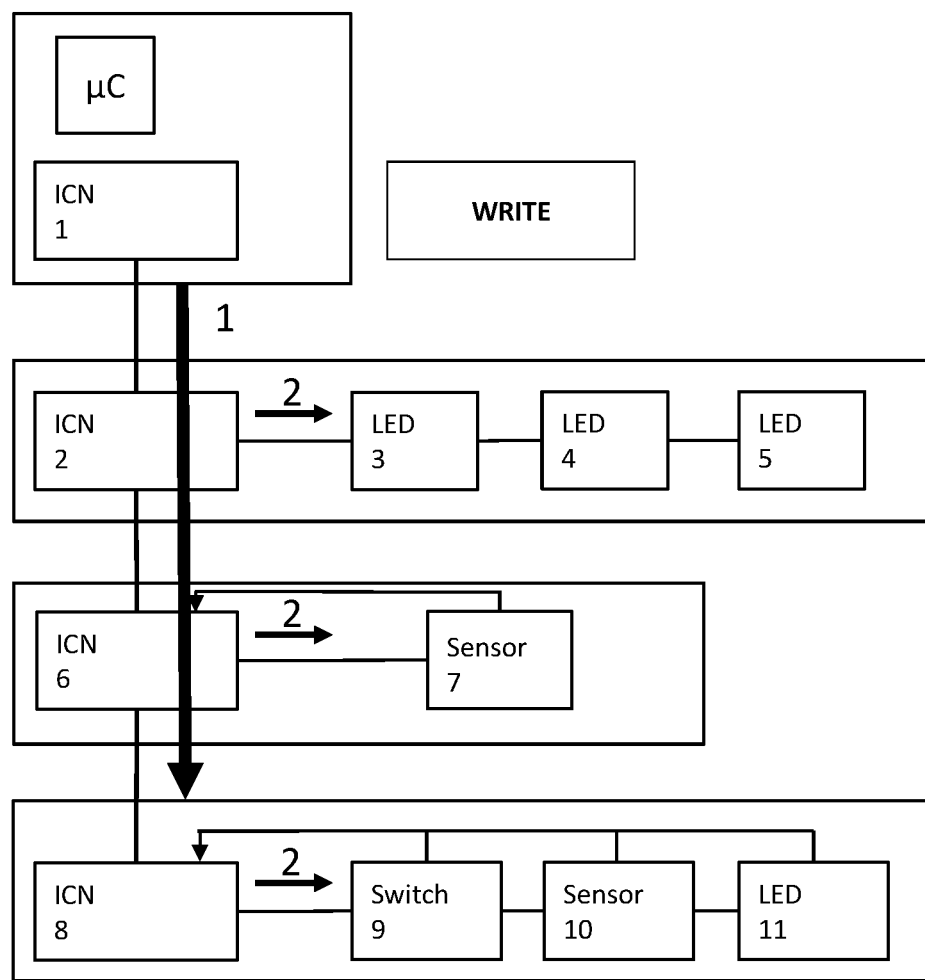
FIG. 6 is a further schematic block diagram showing an aspect of the proposed system arrangement and a communication progression in accordance with the proposed method and in particular execution of the "WRITE" command.

FIG. 6 shows a write process, in which a corresponding query to the communication node ICN is carried over from above and said node subsequently passes on the command both to the right and to the further unit below. If a response is received from the sub-chain by a control unit, this is passed on upwards, and if a communication node receives a response from below, this is likewise passed on to the control unit.

```
STATE="initialized"
when command received at MA_Port:
    pass on to SL_Port and CL_Port
when answer received at CL_Port:
    pass on to MA_Port
when answer received at SL_Port:
    pass on to MA_Port
```

Figure 7:
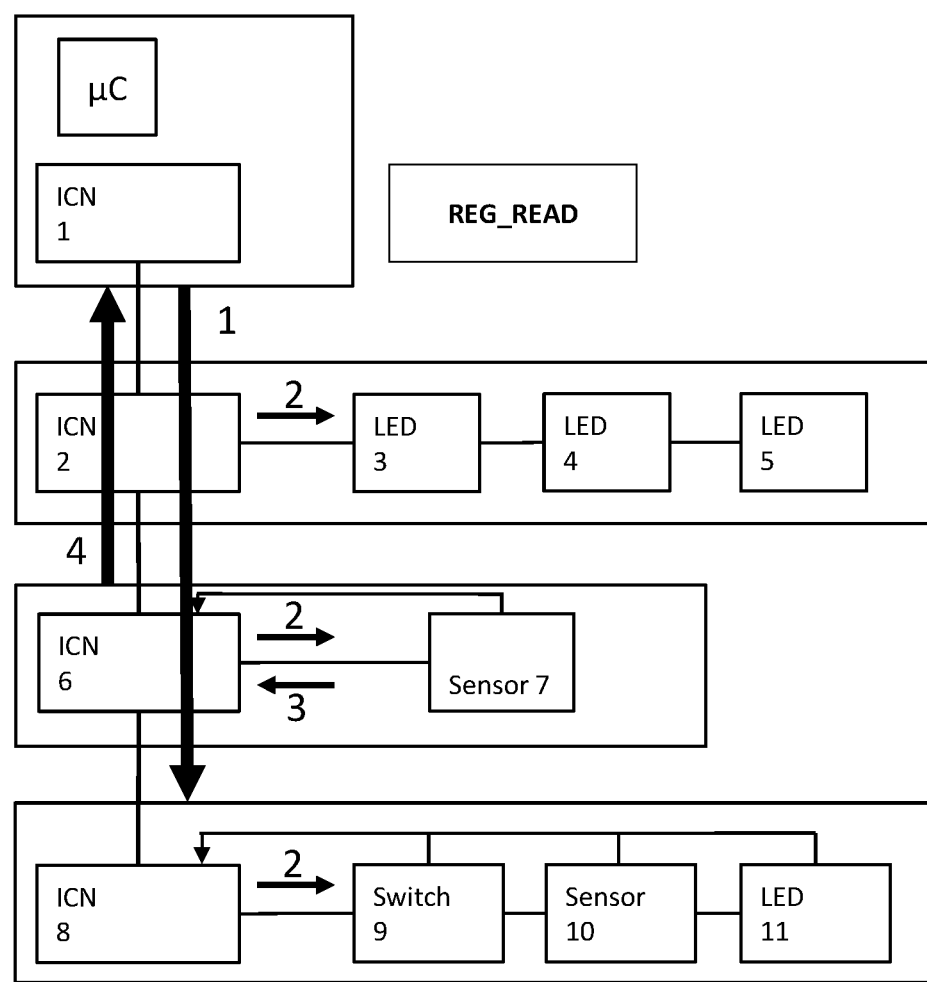
FIG. 7 is a further schematic block diagram showing an aspect of the proposed system arrangement and a communication progression in accordance with the proposed method and in particular execution of the "REG_READ" command.

FIG. 7 shows reading out a registration, a command being received from above at the associated communication node and then being passed on downwards and to the right. If an answer comes from the right, it is passed on upwards, and an answer from below is likewise passed on upwards.

```
STATE="initialized"
when command received at MA_Port:
    pass on to SL_Port and CL_Port
when answer received at CL_Port:
    pass on to MA_Port
when answer received at SL_Port:
    pass on to MA_Port
```

Figure 8:
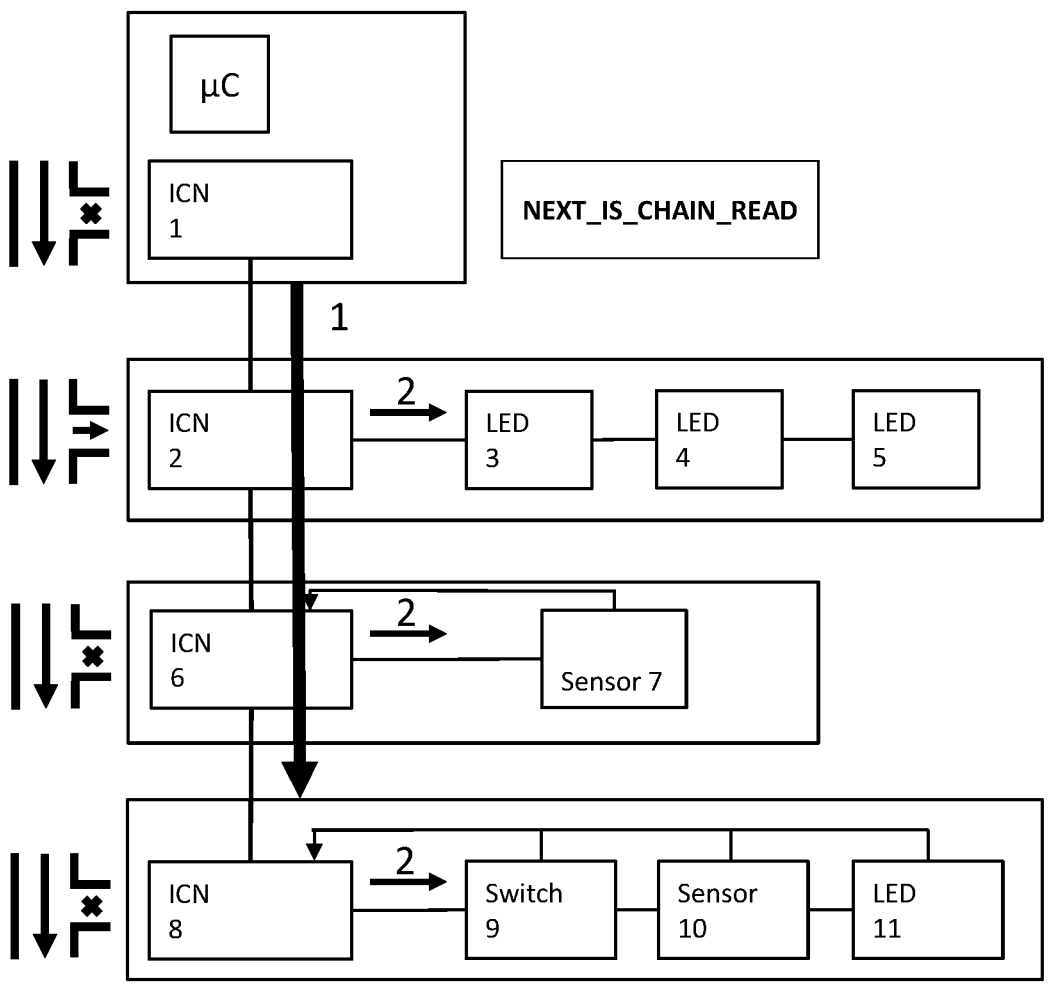
FIG. 8 is a further schematic block diagram showing an aspect of the proposed system arrangement and a communication progression in accordance with the proposed method and in particular execution of the "CHAIN_READ 1" command.

FIG. 8 shows reading out the communication chain, in other words the individual communication nodes. In general, the state of the network is initialised, it also being possible that not all control units have been initialised yet and that it is therefore necessary to wait until the initialised process is terminated. This scenario distinction is shown by the following source code text.

```
STATE="initialized"
NEXT_IS_CHAIN command detected at MA_Port, with
    ICN address as parameter of command:
    if parameter=own_address:
        STATE="initialized"
    else:
        STATE="wait for chain_read"
        when command received at MA_Port:
            pass on to SL_Port, but not CL_Port
        when answer received at CL_Port:
            ignore
        when answer received at SL_Port:
            pass on to MA_Port
```

Figure 9:
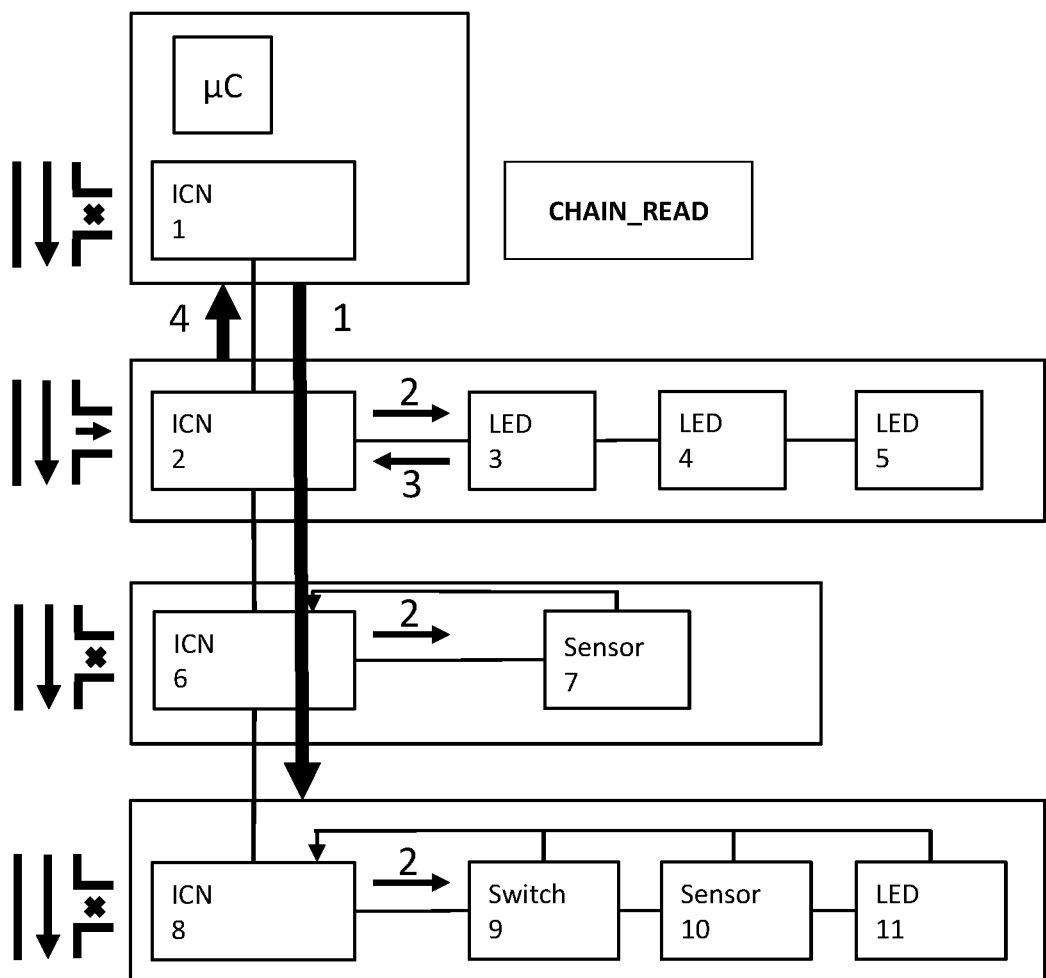
FIG. 9 is a further schematic block diagram showing an aspect of the proposed system arrangement and a communication progression in accordance with the proposed method and in particular execution of the "CHAIN_READ 2" command.

FIG. 9 shows further progression of reading out the communication chain. Here, all execution units are known, and the identifiers are finally passed on to the control unit. The state of the network can thus qualify as initialised.

```
STATE="wait for chain_read"
    wait for CHAIN_READ command at MA_Port
        pass on command to SL_Port, but not CL_Port
        STATE="initialized"
```

Figure 10:
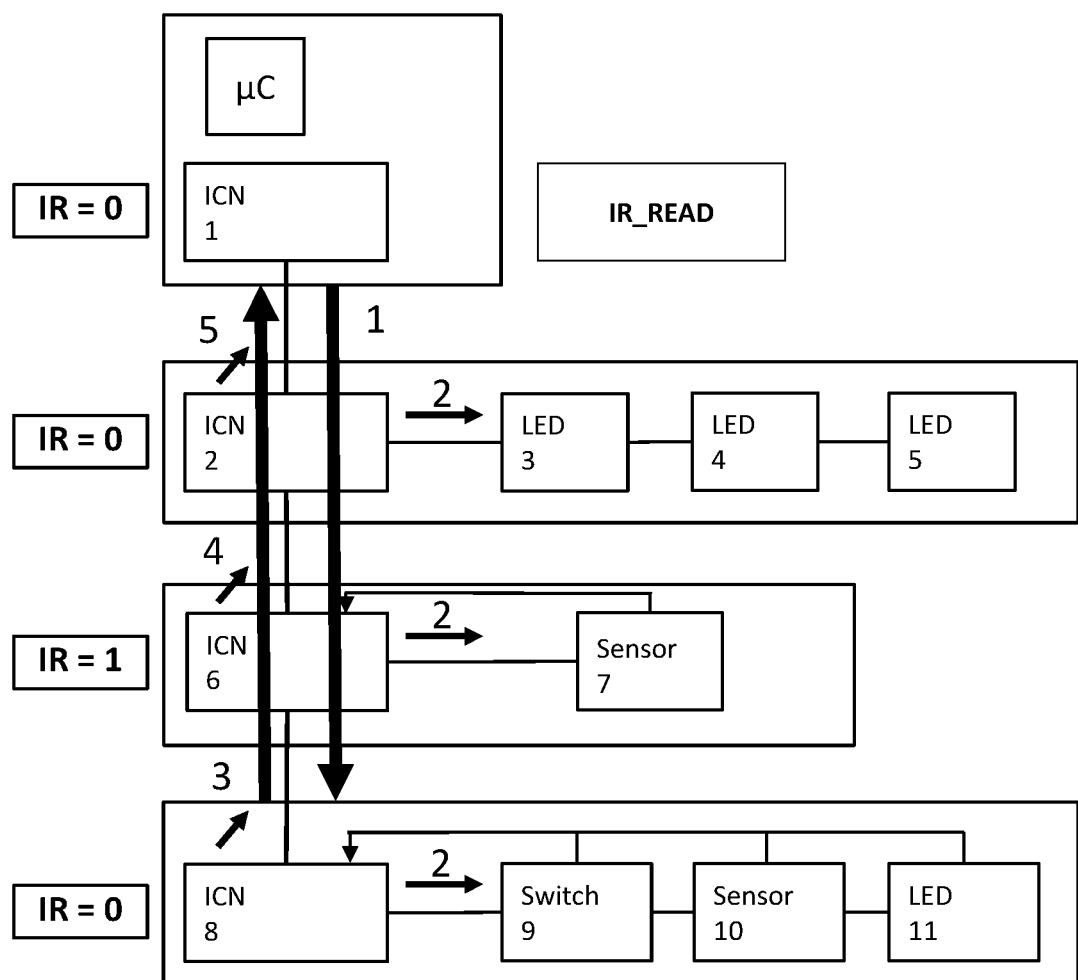
FIG. 10 is a further schematic block diagram showing an aspect of the proposed system arrangement and a communication progression in accordance with the proposed method and in particular execution of the "INTERRUPT 1" command.

FIG. 10 shows an interruption which is passed on to the individual sub-chains. If, in the present example, the last sub-chain is reached, the status of the associated execution units is read out, and these are returned further upwards to the control unit. If the status of the execution units is present, the corresponding parameter is deleted again.

```
STATE="initialized"
when Open Collector pulled down:
    status_client.interrupt=1
IR_READ command detected at MA_Port
    pass on to SL_Port and CL_Port
    if last in chain:
        send Client Status Register as answer to MA_Port
        status_client.interrupt=0
    else:
        wait for answers on SL_Port
            pass on to MA_Port
        when complete:
            send Client Status Register as answer to MA_Port
            status_client.interrupt=0
```

Figure 11:
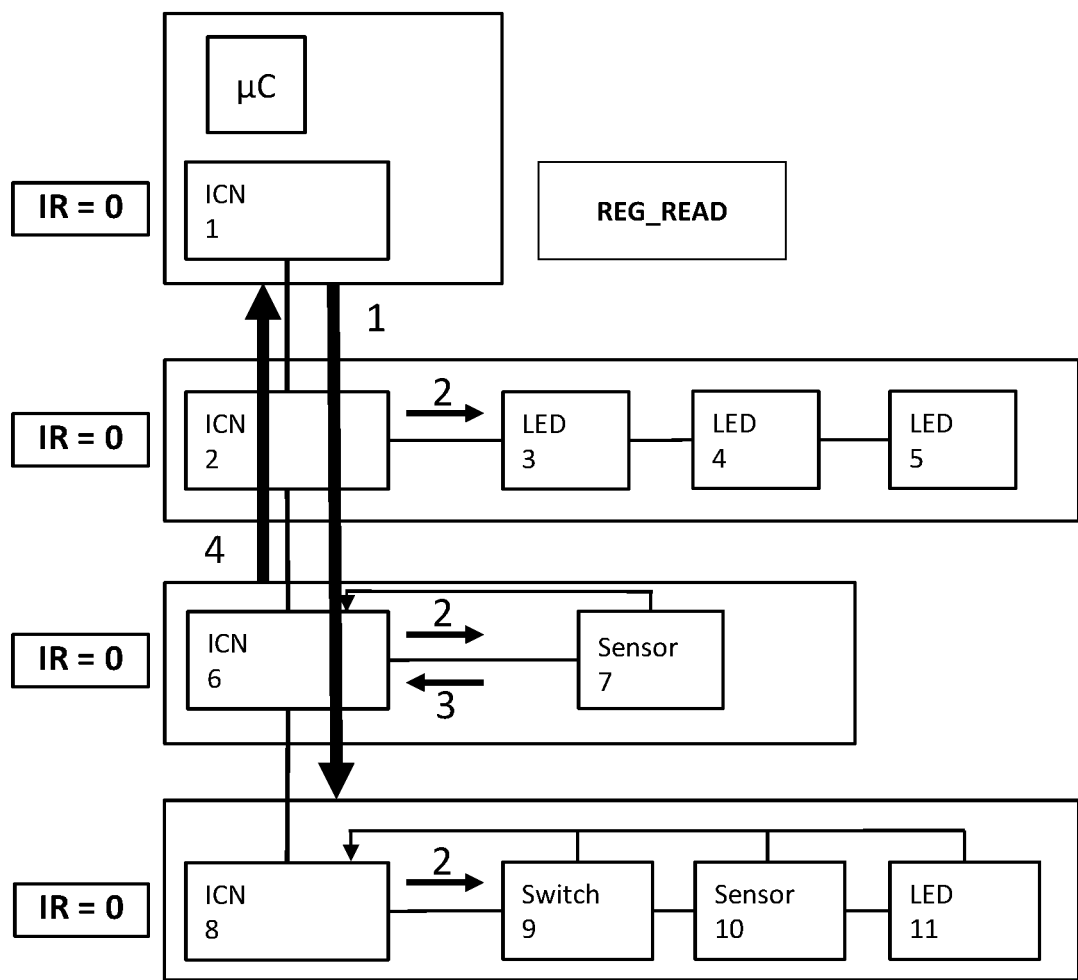
FIG. 11 is a further schematic block diagram showing an aspect of the proposed system arrangement and a communication progression in accordance with the proposed method and in particular execution of the "INTERRUPT 1" command.

FIG. 11 shows the further progression of the interruption process, and shows in particular that the interruption is ultimately eliminated.

```
STATE="initialized"
when Open Collector pulled down:
    status_client.interrupt=1
IR_READ command detected at MA_Port
    pass on to SL_Port and CL_Port
    if last in chain:
        send Client Status Register as answer to MA_Port
        status_client.interrupt=0
    else:
        wait for answers on SL_Port
            pass on to MA_Port
        when complete:
            send Client Status Register as answer to MA_Port
            status_client.interrupt=0
μC:
    If IR=1 at ICN:
        Read interrupt registers of all corresponding clients that
            support interrupt
```

Figure 12:
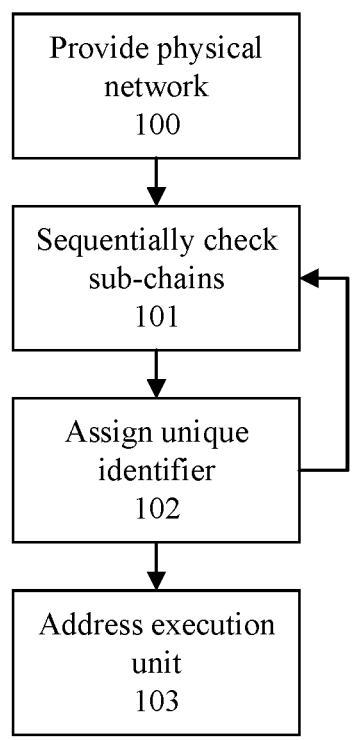
FIG. 12 is a schematic flow chart showing an aspect of the method according to the invention for actuating execution units.

FIG. 12 is a schematic flow chart showing a method for actuating execution units, comprising providing 100 a physical network of series sub-chains of execution units, the individual sub-chains being addressed in series and, if an execution unit fails, merely the rest of the sub-chain failing, each sub-chain initially having exactly one communication node ICN connected upstream, and the communication nodes ICN of the sub-chains being chained together in series in such a way that there is a communication chain of upstream communication nodes ICN, individual communication nodes ICN being switched to be passive in such a way that the rest of the communication chain persists, the communication nodes ICN each having at least one input interface and at least one output interface and the at least one input interface and the at least one output interface being explicitly lockable, sequentially checking 101 each of the sub-chains by means of a query to the respectively upstream communication node ICN of the sub-chain in question, which node assigns 102 a unique identifier to each execution unit of the sub-chain in such a way that each execution unit in the network is assigned a unique identifier, and addressing 103 at least one execution unit, by means of the upstream communication node ICN, with a command generated by a control unit upstream from the communication chain.

In this context, a person skilled in the art will recognise that the described method steps may be carried out iteratively and/or in a different order. In addition, individual method steps may have sub-steps.

What is claimed is:

1. A method for actuating execution units in an automotive LED network, comprising:
   providing (100) a physical automotive LED network of a plurality of series sub-chains of execution units, the individual sub-chains being addressed in series such that upon failure of an execution unit of a particular sub-chain of the plurality, the rest of the sub-chain fails, each sub-chain initially having exactly one upstream communication node, wherein the communication nodes of each of the plurality of individual sub-chains are chained together in series such that there is a communication chain of upstream communication nodes, with individual communication nodes switched to be passive upon failure of the corresponding sub-chain of the plurality in such a way that the rest of the communication chain persists, wherein the communication nodes each have at least one input interface and at least one output interface and the at least one input interface and the at least one output interface are explicitly lockable;
   sequentially checking (101) each of the sub-chains of the plurality by means of a query to the corresponding upstream communication node, which upstream communications node assigns (102) a unique identifier to each execution unit of the corresponding sub-chain such that each execution unit in the network is assigned a unique identifier; and
   actuating (103) at least one execution unit, by means of the upstream communication node, with a command generated by a control unit upstream from the communication chain.

2. The method of claim 1, wherein the actuating (103) comprises a read operation or a write operation.

3. The method of claim 1, wherein the unique identifier takes the form of an address, a numbering or a name.

4. The method of claim 1, wherein when the execution unit is actuated (103) for reading there is only communication with the sub-chain which includes the actuated (103) execution unit.

5. The method of claim 1, wherein the at least one input interface and the at least one output interface can be blocked by the control unit or the associated communication node.

6. The method of claim 1, wherein the at least one input interface and the at least one output interface can be blocked as a function of a provided identifier.

7. The method of claim 1, wherein the individual identifiers are conveyed to the control unit sequentially.

8. The method of claim 1, wherein the identifiers from the sub-chain from which the corresponding communication node is upstream are conveyed to each communication note.

9. The method of claim 1, wherein the execution units are segmented into the sub-chains.

10. A system arrangement for actuating execution units in an automotive LED network, comprising:
    a physical automotive LED network of a plurality of series sub-chains of execution units, the individual sub-chains being addressable in series and being set up such that upon failure of an execution unit of a particular sub-chain of the plurality, the rest of the sub-chain fails, each sub-chain initially having exactly one communication node connected upstream, wherein the communication nodes of each of the plurality of individual sub-chains are chained together in series such that there is a communication chain of upstream communication nodes, with individual communication nodes being switchable to be passive upon failure of the corresponding sub-chain of the plurality in such a way that the rest of the communication chain persists, wherein the communication nodes each have at least one input interface and at least one out-put interface and the at least one input interface and the at least one output interface are explicitly lockable;
    the communication nodes being configured for sequentially checking each of the sub-chains of the plurality by means of a query to a respective upstream communication node of the corresponding sub-chain, which upstream communication node is configured to assign a unique identifier to each execution unit of the corresponding sub-chain such that each execution unit in the network is assigned a unique identifier; and
    a control unit set up for actuating at least one execution unit, by way of the upstream communication node, with a command generated by a control unit upstream from the communication chain.

11. A computer program product comprising a non-transitory storage medium containing control commands which carry out the method of claim 1 when they are executed on a computer.

* * * * *